United States Patent
Wang

(10) Patent No.: US 11,496,376 B2
(45) Date of Patent: Nov. 8, 2022

(54) METHOD AND APPARATUS FOR PROCESSING LOCAL HOT SPOT, ELECTRONIC DEVICE AND STORAGE MEDIUM

(71) Applicant: Beijing Baidu Netcom Science and Technology Co., Ltd., Beijing (CN)

(72) Inventor: Xiaolong Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 123 days.

(21) Appl. No.: 16/891,061

(22) Filed: Jun. 3, 2020

(65) Prior Publication Data
US 2021/0176653 A1    Jun. 10, 2021

(30) Foreign Application Priority Data

Dec. 6, 2019   (CN) .......................... 201911244824.2

(51) Int. Cl.
*H04L 43/04*     (2022.01)
*H04W 24/08*   (2009.01)
*H04W 84/12*   (2009.01)

(52) U.S. Cl.
CPC ............. *H04L 43/04* (2013.01); *H04W 24/08* (2013.01); *H04W 84/12* (2013.01)

(58) Field of Classification Search
CPC ......... H04W 4/001; H04W 4/18; H04W 4/20; H04W 24/00; H04W 24/02; H04W 24/04; H04W 48/02; H04W 48/08; H04W 48/16; H04L 43/04

USPC ........................................ 370/310, 328, 329
See application file for complete search history.

(56) References Cited

U.S. PATENT DOCUMENTS

| | | | |
|---|---|---|---|
| 7,366,519 B2* | 4/2008 | Jason | H04W 8/005 455/423 |
| 8,831,660 B2* | 9/2014 | Jonker | H04W 8/005 455/517 |
| 9,661,515 B2* | 5/2017 | Lord | H04W 24/08 |
| 9,894,630 B2* | 2/2018 | Bradish | H04W 48/12 |
| 10,048,996 B1 | 8/2018 | Bell et al. | |

(Continued)

FOREIGN PATENT DOCUMENTS

| | | |
|---|---|---|
| CN | 102833117 A | 12/2012 |
| CN | 103105923 A | 5/2013 |

(Continued)

*Primary Examiner* — Jason E Mattis
(74) *Attorney, Agent, or Firm* — Kilpatrick Townsend & Stockton LLP

(57) ABSTRACT

A method and apparatus for processing a local hot spot, an electronic device and a storage medium. A specific implementation of the method includes: acquiring, at set times, standalone data of each node device and process data of each process within the each node device in a cloud computing environment; detecting, based on the standalone data of each node device and the process data of each process within the each node device, and pre-acquired historical fault data corresponding to each local hot spot, whether each local hot spot satisfies a preset processing condition corresponding to each local hot spot; and processing the local hot spot satisfying the processing condition, in response to detecting that a local hot spot satisfies the corresponding processing condition.

12 Claims, 3 Drawing Sheets

(56) References Cited

U.S. PATENT DOCUMENTS

| | | | |
|---|---|---|---|
| 10,142,122 B1* | 11/2018 | Hill | H04L 12/2807 |
| 2012/0096144 A1* | 4/2012 | Ledlie | H04L 12/56 |
| | | | 709/224 |
| 2012/0178488 A1 | 7/2012 | Jonker et al. | |
| 2018/0054854 A1 | 2/2018 | Liu | |
| 2019/0098532 A1* | 3/2019 | Rawat | H04W 28/04 |
| 2019/0364492 A1 | 11/2019 | Azizi et al. | |
| 2021/0176653 A1* | 6/2021 | Wang | H04L 67/10 |

FOREIGN PATENT DOCUMENTS

| | | |
|---|---|---|
| CN | 103299683 A | 9/2013 |
| CN | 103345298 A | 10/2013 |
| CN | 110301143 A | 10/2019 |

\* cited by examiner

METHOD AND APPARATUS FOR PROCESSING LOCAL HOT SPOT, ELECTRONIC DEVICE AND STORAGE MEDIUM

CROSS-REFERENCE TO RELATED APPLICATIONS

This application claims priority to Chinese Patent Application No. 201911244824.2, filed with the China National Intellectual Property Administration (CNIPA) on Dec. 6, 2019, the contents of which are incorporated herein by reference in their entirety.

TECHNICAL FIELD

The present disclosure relates to the field of computer application technology, further relates to the field of cloud computing, and specifically to a method and apparatus for processing a local hot spot, an electronic device, and a storage medium.

BACKGROUND

At present, cloud computing services have no pre-set method for solving local hot spots, that is, it is not possible to solve local hot spot problems before they occur, but generally post-solved by simple alarm detection or feedback of the customer's trouble report after a local hot spot problem occurs. Existing technical solutions for local hot spots are all post-solved, and the impact on the customer's business can only be reduced as quickly as possible but cannot be avoided. Specifically, it is due to the following reasons: 1. There is no accurate judgment standard for local hot spots, or only a very rough judgment standard; 2. Because there is no accurate judgment standard, local hot spot problems cannot be automatically and timely detected; 3. Because there are many causes for local hot spot problems, most of which requires manual participation in processing, there is no automatic processing method, and processing takes a long time.

SUMMARY

In view of the above, embodiments of the present disclosure provide a method and apparatus for processing a local hot spot, an electronic device, and a storage medium, which may accurately determine, automatically sense, and automatically process, so that local hot spot problems may be pre-solved.

In a first aspect, some embodiments of the present disclosure provide a method for processing a local hot spot. The method includes:

acquiring, at set times, standalone data of each node device and process data of each process within each node device in a cloud computing environment;

detecting whether each local hot spot satisfies a preset processing condition corresponding to the each local hot spot, based on the standalone data of the each node device and the process data of the each process within the each node device, and pre-acquired historical fault data corresponding to the each local hot spot; and processing, in response to detecting that a local hot spot satisfies a processing condition corresponding thereto, the local hot spot satisfying the processing condition.

The above embodiments have the following advantages or beneficial effects: by acquiring the standalone data of each node device and the process data of each process within the each node device, each local hot spot may be automatically detected and automatically processed. However, in the existing local hot spot processing methods, there is no accurate judgment standard, which makes it impossible to automatically and timely detect local hot spot problems.

In the above embodiment, the detecting whether each local hot spot satisfies a preset processing condition corresponding to the each local hot spot, based on the standalone data of the each node device and the process data of the each process within the each node device, and the pre-acquired historical fault data corresponding to the each local hot spot, includes:

extracting real-time data corresponding to the each local hot spot in the standalone data of the each node device and the process data of the each process within the each node device; the real-time data comprising: the standalone data of the each node device and the process data of the each process within the each node device; and detecting, based on the extracted real-time data corresponding to the each local hot spot and the pre-acquired historical fault data corresponding to the each local hot spot, whether the each local hot spot satisfies the preset processing condition corresponding to the each local hot spot.

The above embodiment has the following advantages or beneficial effects: the present disclosure may pre-define local hot spots, and here the standalone data of each node device and the process data of each process within the each node device may be arbitrarily combined, and the combination thereof is as a local hot spot. Therefore, by acquiring the standalone data of each node device and the process data of each process within each node device in real time, it is possible to detect each local hot spot.

In the above embodiment, the detecting, based on the extracted real-time data corresponding to the each local hot spot and the pre-acquired historical fault data corresponding to the each local hot spot, whether the each local hot spot satisfies the preset processing condition corresponding to the each local hot spot, includes:

determining that a local hot spot satisfies the processing condition corresponding thereto, in response to at least one standalone data in the extracted real-time data corresponding to the each local hot spot being same as at least one standalone data in the pre-acquired historical fault data corresponding to the local hot spot, and at least one process data in the extracted real-time data corresponding to the each local hot spot is same as at least one process data in the pre-acquired historical fault data corresponding to the local hot spot.

The above embodiment has the following advantages or beneficial effects: the present disclosure may define the processing condition that each local hot spot satisfies. The processing condition here may be based on one standalone data and one process data, or may be based on a plurality of standalone data and a plurality of process data, which is not limited herein.

In the above embodiment, the processing, in response to detecting that a local hot spot satisfies a processing condition corresponding thereto, the local hot spot satisfying the processing condition, includes:

in response to detecting that a local hot spot satisfies the processing condition corresponding thereto, determining whether the local hot spot satisfying the processing condition is a preset critical local hot spot;

in response to the local hot spot satisfying the processing condition being the critical local hot spot, sending a confirmation request to a manual monitoring device corresponding to the local hot spot; receiving a confirmation response returned from the manual monitoring device; and processing the local hot spot satisfying the condition based on the confirmation response; and in response to the local hot spot satisfying the processing condition being not the critical local hot spot, processing directly the local hot spot satisfying the condition.

The above embodiment has the following advantages or beneficial effects: the present disclosure may distinguish between a critical local hot spot and non-critical local hot spot. If a local hot spot satisfying the processing condition is a critical local hot spot, manual intervention is required to confirm whether the local hot spot is to be processed; and if the local hot spot satisfying the processing condition is a non-critical local hot spot, the local hot spot may be processed directly without manual intervention.

In the above embodiment, the standalone data of the each node device at least includes: a model of the each node device, an oversold ratio of the each node device, a CPU of the each node device, a memory of the each node device, a total disk capacity of the each node device, a number of sales of the each node device, a sales area of the each node device, an available area of the each node device, and a resource group comprised in the each node device; and the process data of the each process within the each node device comprises at least: CPU utilization of the each process, memory utilization of the each process, and disk utilization of the each process.

The above embodiment has the following advantages or beneficial effects: the present disclosure may define the standalone data of each node device and the process data of each process within each node device, which is not limited herein.

In a second aspect, some embodiments of the present disclosure provide an apparatus for processing a local hot spot. The apparatus includes: an acquisition module, a detection module and a processing module; where, the acquisition module, is configured to acquire, at set times, standalone data of each node device and process data of each process within each node device in a cloud computing environment;

the detection module, is configured to detect whether each local hot spot satisfies a preset processing condition corresponding to the each local hot spot, based on the standalone data of the each node device and the process data of each process within the each node device, and pre-acquired historical fault data corresponding to the each local hot spot; and the processing module, is configured to process, in response to detecting that a local hot spot satisfies a processing condition corresponding thereto, the local hot spot satisfying the processing condition.

In the above embodiment, the detection module comprises: an extraction sub-module and a detection sub-module; wherein, the extraction sub-module, is configured to extract real-time data corresponding to the each local hot spot in the standalone data of the each node device and the process data of the each process within the each node device; the real-time data comprising: the standalone data of the each node device and the process data of the each process within the each node device; and the detection sub-module, is configured to detect, based on the extracted real-time data corresponding to the each local hot spot and the pre-acquired historical fault data corresponding to the each local hot spot, whether the each local hot spot satisfies the preset processing condition corresponding to the each local hot spot.

In the above embodiment, the detection sub-module, is specifically configured to determine that a local hot spot satisfies the processing condition corresponding thereto, in response to at least one standalone data in the extracted real-time data corresponding to the each local hot spot being same as at least one standalone data in the pre-acquired historical fault data corresponding to the local hot spot, and at least one process data in the extracted real-time data corresponding to the each local hot spot being same as at least one process data in the pre-acquired historical fault data corresponding to the local hot spot.

In the above embodiment, the processing module, is specifically configured to, in response to detecting that a local hot spot satisfies the processing condition corresponding thereto, determine whether the local hot spot satisfying the processing condition is a preset critical local hot spot; in response to the local hot spot satisfying the processing condition being the critical local hot spot, send a confirmation request to a manual monitoring device corresponding to the local hot spot; receive a confirmation response returned from the manual monitoring device; and process the local hot spot satisfying the condition based on the confirmation response; and in response to the local hot spot satisfying the processing condition being not the critical local hot spot, process directly the local hot spot satisfying the condition.

In the above embodiment, the standalone data of each node device at least comprises: a model of the each node device, an oversold ratio of the each node device, a CPU of each node device, a memory of each node device, a total disk capacity of the each node device, a number of sales of the each node device, a sales area of the each node device, an available area of the each node device, and a resource group comprised in the each node device; and the process data of each process within the each node device comprises at least: CPU utilization of each process, memory utilization of each process, and disk utilization of the each process.

In a third aspect, some embodiments of the present disclose provides an electronic device, including: at least one processor; and a memory, in communication connection with the at least one processor; wherein, the memory storing instructions executable by the at least one processor, the instructions, when executed by the at least one processor, cause the at least one processor to implement the method according to any one of the embodiments in the present disclosure.

In a fourth aspect, some embodiments of the present disclosure provide a non-transitory computer readable storage medium, storing computer instructions thereon, the computer instructions, being used to cause the computer to implement the method according to any one of the embodiments in the present disclosure.

Embodiments in the above disclosure have the following advantages or beneficial effects: the method and apparatus for processing a local hot spot, the electronic device, and the storage medium proposed in the embodiments of the present disclosure, first acquiring, at set times, standalone data of each node device and process data of each process within each node device in a cloud computing environment; then detecting whether each local hot spot satisfies a preset processing condition corresponding to the each local hot spot, based on the standalone data of each node device and the process data of each process within each node device, and pre-acquired historical fault data corresponding to each local hot spot; and processing, in response to detecting that each local hot spot satisfies the processing condition corresponding thereto, the local hot spot satisfying the processing condition. That is, in embodiments of the present disclosure, by acquiring the standalone data of each node device and the process data of each process within each node device, each local hot spot may be automatically detected and automatically processed. However, in the existing local hot spot processing methods, there is no accurate judgment standard, which makes it impossible to automatically and timely detect local hot spot problems. Because embodiments of the present disclosure adopt regular acquisition of standalone data of each node device and process data of each process within each node device, and accurate formulation of the judgment standard for each local hot spot, it overcomes the problem of not being able to detect local hot spot problems automatically and timely due to the lack of accurate judgment standard in the prior art, so that the local hot spot problems may be solved in advance; in addition, the technical solution of the embodiments of the present disclosure is simple and convenient to implement, easy to popularize, and has a wider application range.

Other effects possessed by the foregoing alternative method will be described below in conjunction with specific embodiments.

BRIEF DESCRIPTION OF THE DRAWINGS

The accompanying drawings are used to better understand the present solution and do not constitute a limitation of the present disclosure. Here.

DETAILED DESCRIPTION OF EMBODIMENTS

The following describes exemplary embodiments of the present disclosure with reference to the accompanying drawings, which includes various details of the embodiments of the present disclosure to facilitate understanding, and they should be considered as merely exemplary. Therefore, those of ordinary skills in the art should recognize that various changes and modifications may be made to the embodiments described herein without departing from the scope and spirit of the present disclosure. Also, for clarity and conciseness, descriptions of well-known functions and structures are omitted in the following description.

Embodiment 1

Figure 1:
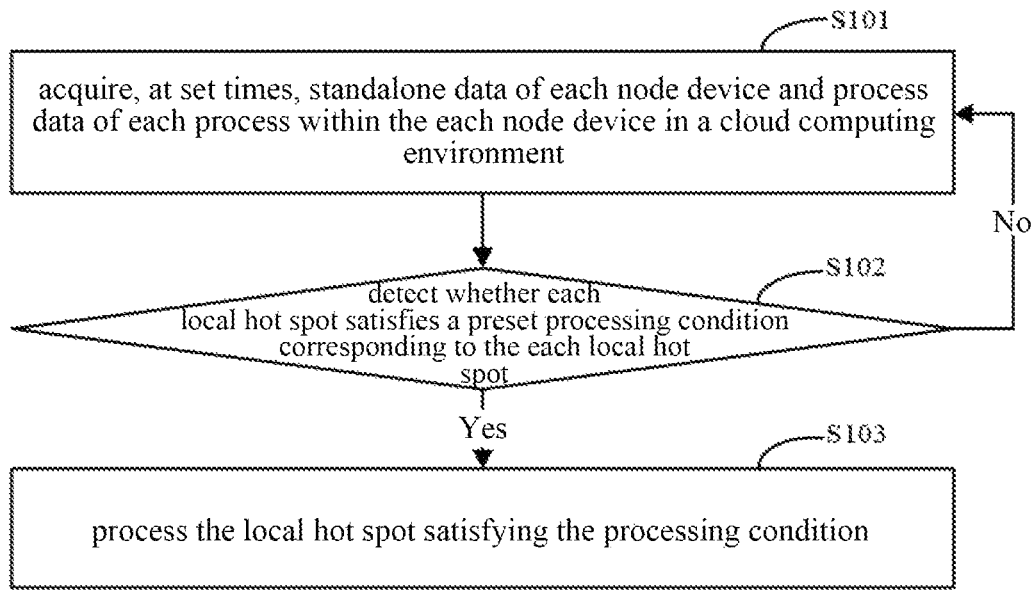
FIG. 1 is a schematic flowchart of a method for processing a local hot spot provided in Embodiment 1 of the present disclosure.

FIG. 1 is a schematic flowchart of a method for processing a local hot spot provided in Embodiment 1 of the present disclosure, the method may be performed by an apparatus for processing a local hot spot or an electronic device. The apparatus or electronic device may be implemented by software and/or hardware. The apparatus or electronic device may be integrated in any smart device having network communication function. As shown in FIG. 1, the method for processing a local hot spot may include the following steps:

S101, acquiring, at set times, standalone data of each node device and process data of each process within each node device in a cloud computing environment.

In a specific embodiment of the present disclosure, the electronic device may regularly acquire the standalone data of each node device and the process data of each process within each node device in the cloud computing environment. Specifically, assuming that the cloud computing environment includes: node device 1, node device 2, . . . , node device N; where N is a natural number greater than or equal to 1. In this step, the electronic device may acquire the standalone data of node device 1, node device 2, . . . , node device N, and the process data of each process within node device 1, the process data of each process within node device 2, . . . , the process data of each process within node device N.

Preferably, in a specific embodiment of the present disclosure, the standalone data of each node device at least includes: the model of each node device, the oversold ratio of each node device, the CPU of each node device, the memory of each node device, the total disk capacity of each node device, the number of sales of each node device, the sales area of each node device, the available area of each node device, and the resource group included in each node device; and the process data of each process within each node device includes at least: CPU utilization of each process, memory utilization of each process, and disk utilization of each process.

S102, detecting, based on the standalone data of each node device and the process data of each process within each node device, and pre-acquired historical fault data corresponding to each local hot spot, whether each local hot spot satisfies a preset processing condition corresponding to each local hot spot; if yes, perform S103; otherwise, return to perform S101.

In a specific embodiment of the present disclosure, the electronic device may detect, based on the standalone data of each node device and the process data of each process within each node device, and the pre-acquired historical fault data corresponding to each local hot spot, whether each local hot spot satisfies the preset processing condition corresponding to the each local hot spot. Specifically, the electronic device may preset the processing condition corresponding to the each local hot spot based on the pre-acquired historical fault data corresponding to the each local hot spot. For example, the processing condition for local hot spot 1 is: the model of node device 1 is HP: DL388 Gen8 E5-2620; and the CPU utilization of a certain business process is 50%. In this step, assuming that the CPU utilization of a certain business process in node device 1 reaches 50%, the electronic device may determine that the business process has satisfied the preset processing condition corresponding to the local hot spot.

S103, processing the local hot spot satisfying the processing condition.

In a specific embodiment of the present disclosure, if it is detected that a local hot spot satisfies the corresponding processing condition, the electronic device processes the local hot spot satisfying the processing condition. For example, if the electronic device detects that local hot spot 1 satisfies the processing condition corresponding to local hot spot 1, in this step, the electronic device may process local hot spot 1. If it is detected that the each local hot spot does not satisfy the corresponding processing condition, the electronic device returns to perform S101.

The method for processing a local hot spot proposed in the embodiments of the present disclosure, first acquiring at set times standalone data of each node device and process data of each process within each node device in a cloud computing environment; then detecting, based on the standalone data of each node device and the process data of each process within each node device, and the pre-acquired historical fault data corresponding to each local hot spot, whether each local hot spot satisfies a preset processing condition corresponding to each local hot spot; and processing, in response to detecting that a local hot spot satisfies the corresponding processing condition, the local hot spot satisfying the processing condition. That is, in embodiments of the present disclosure, by acquiring the standalone data of each node device and the process data of each process within each node device, each local hot spot may be automatically detected and automatically processed. However, in the existing local hot spot processing methods, there is no accurate judgment standard, which makes it impossible to automatically and timely detect local hot spot problems. Because the embodiments of the present disclosure adopt regular acquisition of standalone data of each node device and process data of each process within each node device, and accurate formulation of the judgment standard for each local hot spot, it overcomes the problem of not being able to detect local hot spot problems automatically and timely due to the lack of accurate judgment standard in the prior art, so that the local hot spot problems may be pre-solved; in addition, the technical solution of the embodiments of the present disclosure is simple and convenient to implement, easy to popularize, and has a wider application range.

Embodiment 2

Figure 2:
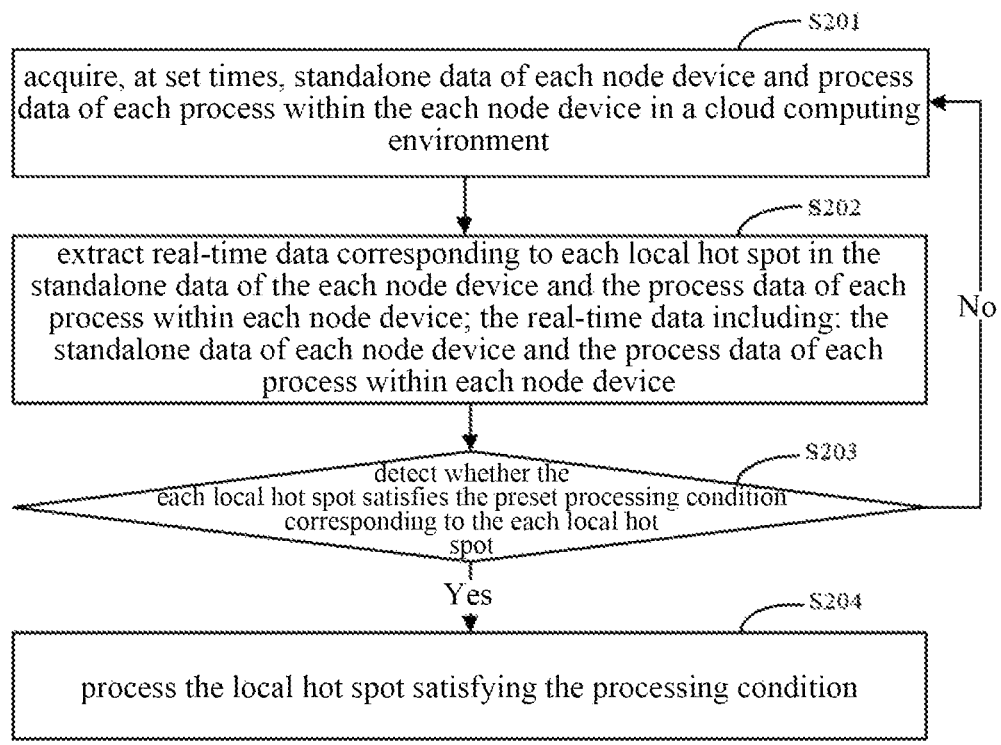
FIG. 2 is a schematic flowchart of the method for processing a local hot spot provided in Embodiment 2 of the present disclosure.

FIG. 2 is a schematic flowchart of the method for processing a local hot spot provided in Embodiment 2 of the present disclosure. As shown in FIG. 2, the method for processing a local hot spot may include the following steps:

S201, acquiring, at set times, standalone data of each node device and process data of each process within each node device in a cloud computing environment.

In a specific embodiment of the present disclosure, the electronic device may regularly acquire the standalone data of each node device and the process data of each process within each node device in the cloud computing environment.

Specifically, assuming that the cloud computing environment includes: node device 1, node device 2, . . . , node device N; where N is a natural number greater than or equal to 1. In this step, the electronic device may acquire the standalone data of node device 1, node device 2, . . . , node device N, and the process data of each process within node device 1, the process data of each process within node device 2, . . . , the process data of each process within node device N.

S202, extracting real-time data corresponding to each local hot spot in the standalone data of each node device and the process data of each process within each node device; the real-time data including: the standalone data of each node device and the process data of each process within each node device.

In a specific embodiment of the present disclosure, the electronic device may extract the real-time data corresponding to the each local hot spot in the standalone data of the each node device and the process data of each process within the each node device. The real-time data includes: the standalone data of the each node device and the process data of the each process within the each node device. Specifically, a local hot spot may be pre-defined in the present disclosure, for example, a local hot spot may be defined based on the CPU of node device 1 and the CPU utilization of a process in node device 1; and a local hot spot may also be defined based on the model of node device 2 and the memory utilization of a process in node device 2. Here the standalone data of the each node device and the process data of the each process within the each node device may be arbitrarily combined, and the combination may be defined as a local hot spot.

S203, detecting, based on the extracted real-time data corresponding to each local hot spot, and the pre-acquired historical fault data corresponding to each local hot spot, whether each local hot spot satisfies the preset processing condition corresponding to each local hot spot; if yes, perform S204; otherwise, return to perform S201.

In a specific embodiment of the present disclosure, the electronic device may detect, based on the standalone data of the each node device and the process data of each process within the each node device and the pre-acquired historical fault data corresponding to the each local hot spot, whether the each local hot spot satisfies the preset processing condition corresponding to the each local hot spot. Specifically, for a local hot spot in a node device, a standalone monitoring method may be used to detect whether the node device satisfies the preset processing condition corresponding to the local hot spot; and for a local hot spot in a cloud computing environment, an out-of-band monitoring method may be used to detect whether the local hot spot satisfies the preset processing condition corresponding to the local hot spot. Specifically, a local hot spot in a node device refer to: whether the local hot spot satisfies the corresponding processing condition may be detected through a single node device; and a local hot spot in a cloud computing environment refer to: it is not possible to detect whether the local hot spot satisfies the corresponding processing condition through a single node device, instead, whether the local hot spot satisfies the corresponding processing condition may be detected through a plurality of node devices.

Step 204, processing the local hot spot satisfying the processing condition.

In a specific embodiment of the present disclosure, if it is detected that a local hot spot satisfies the corresponding processing condition, the electronic device processes the local hot spot satisfying the processing condition. For example, if the electronic device detects that local hot spot 1 satisfies the processing condition corresponding to local hot spot 1, in this step, the electronic device may process local hot spot 1. If it is detected that the each local hot spot doesn't satisfy the corresponding processing condition, the electronic device returns to perform S201.

In a specific embodiment of the present disclosure, the method for processing a local hot spot may include: data construction, automatic detection and automatic processing.

Here, data construction includes: data acquisition, data processing and storage, data query and display.

Figure 3:
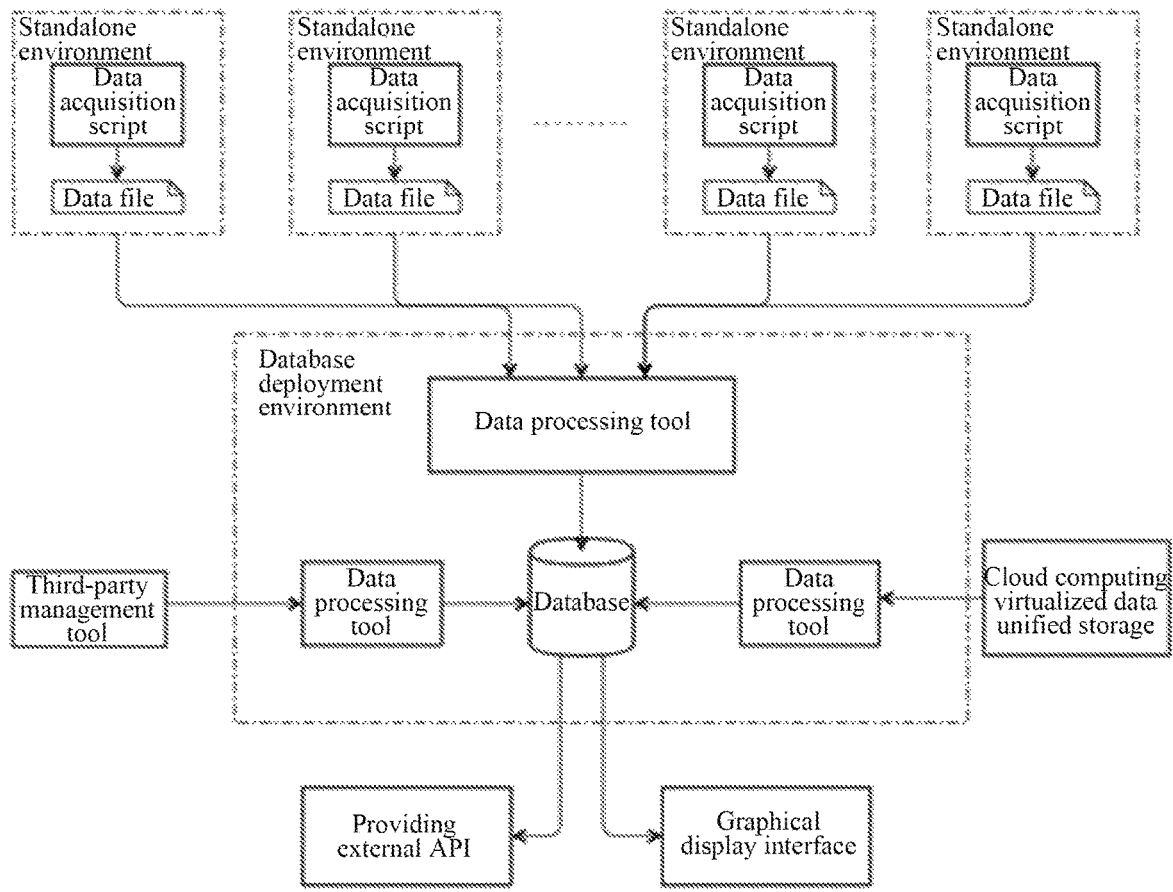
FIG. 3 is a schematic flowchart of data construction provided in Embodiment 2 of the present disclosure.

FIG. 3 is a schematic flowchart of data construction provided in Embodiment 2 of the present disclosure. As shown in FIG. 3, in terms of data construction, it includes:
1) Data acquisition, includes: a) Objective data acquisition:

acquires data related to standalone resources in cloud computing service, including: standalone machine granularity and internal process granularity in a standalone machine: standalone machine granularity: model, oversold ratio, and complete device CPU, memory, total disk capacity, and already sold quantity, area, available area, resource group, etc. The internal process granularity in a standalone machine: CPU, memory, disk utilization of cloud computing basic services and customer business; b) Historical fault data acquisition: establishes a long-effect mechanism for data acquisition and analysis of local hot spot problems, finds out common influencing factors in the fault scenarios by analyzing and abstracting local hot spot fault scenarios. In the process of data acquisition, for each standalone environment, data acquisition scripts are used for data acquisition, and a data file is formed based on the acquired data. 2) Data processing and storage: the data acquired from different data sources are standardized and then stored into a database. Data processing uses a standalone machine IP as the unique identifier, associates the acquired data with the corresponding machine IP, and finally forms a series of resource-related data about the machine. In the process of data processing and storage, a data processing tool is used to process the data file in each standalone machine environment, and the processed data in each standalone machine environment are transmitted to the database DB at set times; in addition, the data processing tool may also be used to process data in a third-party management tool and cloud computing virtualized data unified storage, and the processed data are transmitted to the database DB regularly. 3) Data query and display, using a graphical display tool (such as grafana), back-end connecting to the database, performs graphical display and analysis of data, to multi-dimensional display, screen, historical trend analyze, etc., for the acquired data. Based on the analysis of multi-dimensional and historical trend, corresponding to the historical fault data, potential trigger condition of the local hot spot is mined. In the process of data query and display, it is possible to perform query and display by providing external API or graphical display interface.

In terms of automatic sensing, it includes: monitoring based on the standalone machine level, monitoring based on multi-dimensional data analysis, and configuring a separate monitoring for a hot spot scenario. Here, monitoring based on the standalone machine level: for a scenario where a local hot spot may be determined through only standalone machine data (such as the CPU utilization of the entire machine exceeding 98% lasts for 5 minutes), the monitoring is configured directly on the standalone machine, once the machine reaches the local hot spot condition, an alarm may be triggered. Monitoring based on dimensional data analysis: if a local hot spot scenario requires to be determined based on multi-dimensional data of data construction, it may configure the out-of-band monitoring, when the trigger condition is reached, and an alarm may then be triggered. Configuring a separate monitoring for a hot spot scenario: the monitoring of a hot spot scenario is atomic, that is, one local hot spot scenario is configured with one corresponding monitoring.

In terms of automatic processing, automatic processing as a means of monitoring callback calls corresponding automatic processing modules for processing for different local hot spot scenarios. Automatic processing has the following main features: the overall processing is automated, but critical points need to be manually clicked to confirm, to ensure stability and control risks; the processing of each local hot spot scenario is independent and decoupled, which is convenient for later maintenance; after a hot spot scenario is added, both automatic detection and automatic processing may be quickly expanded; and if there are a plurality of different hot spot scenarios, the processing methods thereof are identical, and same automatic processing module may also be used.

In a specific embodiment of the present disclosure, when processing the local hot spot satisfying the processing condition, it may be first determined whether the local hot spot is a preset critical local hot spot. Specifically, if it is detected that a local hot spot satisfies the corresponding processing condition, determining whether the local hot spot satisfying the processing condition is a preset critical local hot spot; if the local hot spot satisfying the processing condition is the critical local hot spot, sending a confirmation request to a manual monitoring device corresponding to the local hot spot; receiving a confirmation response returned by the manual monitoring device; and processing the local hot spot satisfying the condition based on the confirmation response; and if the local hot spot satisfying the processing condition is not the critical local hot spot, processing directly the local hot spot satisfying the condition.

The method for processing a local hot spot proposed in the embodiments of the present disclosure, first acquiring, at set times, standalone data of each node device and process data of each process within each node device in a cloud computing environment; then detecting whether each local hot spot satisfies a preset processing condition corresponding to the each local hot spot, based on the standalone data of the each node device and the process data of each process within the each node device, and pre-acquired historical fault data corresponding to the each local hot spot; and processing, in response to detecting that a local hot spot satisfies a processing condition corresponding thereto, the local hot spot satisfying the processing condition. That is, in some embodiments of the present disclosure, by acquiring the standalone data of the each node device and the process data of each process within the each node device, each local hot spot may be automatically detected and automatically processed. However, in the existing local hot spot processing methods, there is no accurate judgment standard, which makes it impossible to automatically and timely detect local hot spot problems. Because some embodiments of the present disclosure adopt regular acquisition of standalone data of the each node device and process data of each process within the each node device, and accurately formulates the judgment standard for each local hot spot, it overcomes the problem of not being able to detect local hot spot problems automatically and timely due to the lack of accurate judgment standard in the prior art, so that the local hot spot problems may be solved in advance; in addition, the technical solution of the embodiments of the present disclosure is simple and convenient to implement, easy to popularize, and has a wider application range.

Embodiment 3

Figure 4:
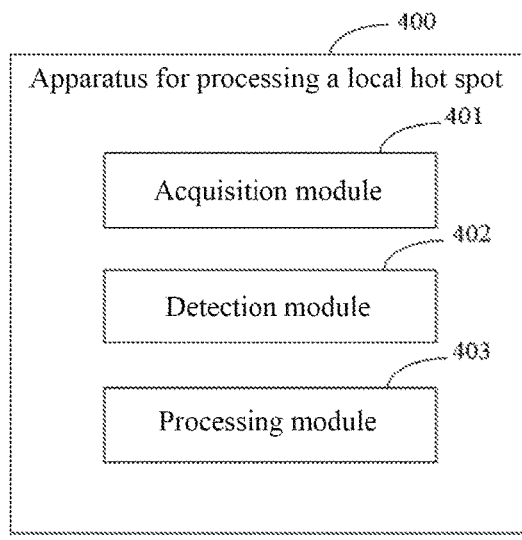
FIG. 4 is a schematic structural diagram of an apparatus for processing a local hot spot provided in Embodiment 3 of the present disclosure.

FIG. 4 is a schematic structural diagram of an apparatus for processing a local hot spot provided in Embodiment 3 of the present disclosure. As shown in FIG. 4, the apparatus 400 includes: an acquisition module 401, a detection module 402 and a processing module 403; where, the acquisition module 401, is configured to acquire, at set times, standalone data of each node device and process data of each process within each node device in a cloud computing environment;

the detection module 402, is configured to detect whether each local hot spot satisfies a preset processing condition corresponding to the each local hot spot, based on the standalone data of the each node device and the process data of each process within the each node device, and pre-acquired historical fault data corresponding to each local hot spot; and the processing module 403, is configured to process, in response to detecting that a local hot spot satisfies a processing condition corresponding thereto, the local hot spot satisfying the processing condition.

Figure 5:
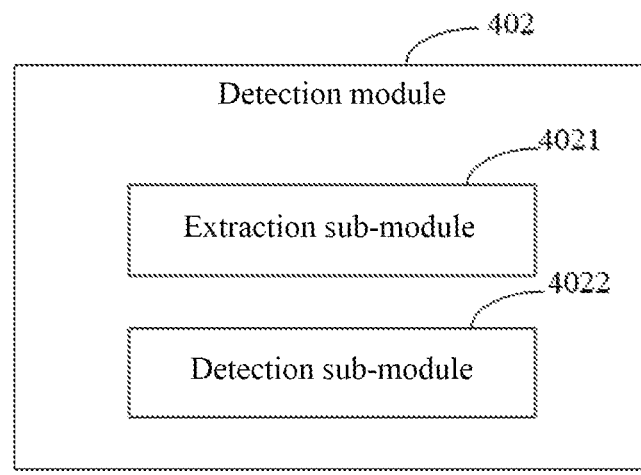
FIG. 5 is a schematic structural diagram of a detection module provided in Embodiment 3 of the present disclosure.

FIG. 5 is a schematic structural diagram of a detection module provided in Embodiment 3 of the present disclosure. As shown in FIG. 5, the detection module 402 includes: an extraction sub-module 4021 and a detection sub-module 4022; where, the extraction sub-module 4021, is configured to extract real-time data corresponding to each local hot spot in the standalone data of the each node device and the process data of each process within the each node device; the real-time data including: the standalone data of the each node device and the process data of each process within the each node device; and the detection sub-module 4022, is configured to detect, based on the extracted real-time data corresponding to each local hot spot and the pre-acquired historical fault data corresponding to the each local hot spot, whether the each local hot spot satisfies the preset processing condition corresponding to the each local hot spot.

Further, the detection sub-module 4022, is specifically configured to determine that a local hot spot satisfies the processing condition corresponding thereto, in response to at least one standalone data in the extracted real-time data corresponding to the each local hot spot being the same as at least one standalone data in the pre-acquired historical fault data corresponding to the local hot spot, and at least one process data in the extracted real-time data corresponding to each local hot spot being the same as at least one process data in the pre-acquire historical fault data corresponding to the local hot spot.

Further, the processing module 403, is specifically configured to, if it is detected that a local hot spot satisfies the processing condition corresponding thereto, determine whether the local hot spot satisfying the processing condition is a preset critical local hot spot; in response to the local hot spot satisfying the processing condition being the critical local hot spot, send a confirmation request to a manual monitoring device corresponding to the local hot spot; receive a confirmation response returned from the manual monitoring device; and process the local hot spot satisfying the condition based on the confirmation response; and in response to the local hot spot satisfying the processing condition being not the critical local hot spot, process directly the local hot spot satisfying the condition.

Further, the standalone data of each node device at least includes: a model of the each node device, an oversold ratio of the each node device, a CPU of the each node device, a memory of the each node device, a total disk capacity of the each node device, the number of sales of the each node device, a sales area of the each node device, an available area of the each node device, and a resource group included in the each node device; and the process data of each process within the each node device includes at least: CPU utilization of each process, memory utilization of each process, and disk utilization of the each process.

The apparatus for processing a local hot spot may perform the method provided in any embodiment of the present disclosure, and has the corresponding functional modules and beneficial effects to perform the method. For technical details not described in detail in the present embodiment, reference may be made to the method for processing a local hot spot provided in any embodiment of the present disclosure.

Embodiment 4

According to some embodiments of the present disclosure, an electronic device and a readable storage medium are provided.

Figure 6:
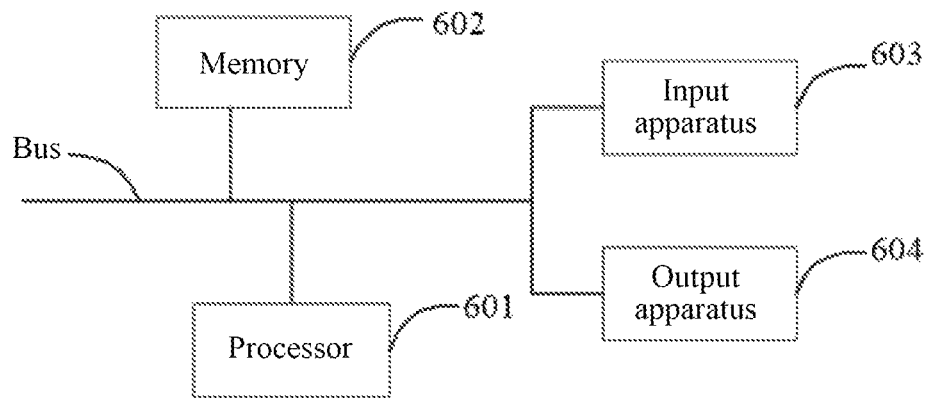
FIG. 6 is a block diagram of an electronic device for implementing the method for processing a local hot spot according to an embodiment of the present disclosure.

As shown in FIG. 6, a block diagram of an electronic device for implementing the method for processing a local hot spot according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown here, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including a high-speed interface and a low-speed interface. The various components are connected to each other using different buses and may be installed on a common motherboard or in other methods as needed. The processor may process instructions executed within the electronic device, including instructions stored in or on the memory to display GUI graphical information on an external input/output apparatus such as a display device coupled to the interface. In other embodiments, a plurality of processors and/or a plurality of buses may be used with a plurality of memories if needed. Similarly, a plurality of electronic devices may be connected, and each device provides part necessary operations (for example, as a server array, a set of blade servers, or a multi-processor system). One processor 601 is used as an example in FIG. 6.

The memory 602 is a non-transitory computer readable storage medium provided by some embodiments of the present disclosure. Here, the memory stores instructions executable by at least one processor, so that cause the at least one processor performs the method for processing a local hot spot provided by some embodiments of the present disclosure. The non-transitory computer readable storage medium of the present disclosure stores computer instructions, to cause the computer to perform the method for processing a local hot spot provided in the embodiments of the present disclosure.

The memory 602 as a non-transitory computer readable storage medium may be used to store non-transitory software programs, non-transitory computer executable programs and modules, such as program instructions/modules (for example, the acquisition module 401, the detection module 402, and the processing module 403 shown in FIG. 4) corresponding to the method for processing a local hot spot in the embodiments of the present disclosure. The processor 601 executes non-transitory software programs, instructions, and modules stored in the memory 602 to execute various functional applications and data processing of the server, that is, to implement the method for processing a local hot spot in the foregoing method embodiments.

The memory 602 may include a storage program area and a storage data area, where the storage program area may store an operation system and at least one function required application program; and the storage data area may store data and the like created by the use of the electronic device according to the method for processing a local hot spot. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include memories set remotely relative to the processor 601, and these remote memories may be connected to the electronic device of the method for processing a local hot spot through a network. Examples of the network include but are not limited to the Internet, intranet, local area network, mobile communication network, and combinations thereof.

The electronic device of the method for processing a local hot spot may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal input related to user settings and function control of the electronic device of the method for processing a local hot spot, input apparatuses such as a touch screen, keypad, mouse, trackpad, touchpad, pointing stick, one or more mouse buttons, trackball, or joystick. The output apparatus 604 may include a display device, an auxiliary lighting apparatus (for example, LED), a tactile feedback apparatus (for example, a vibration motor), or the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, a dedicated ASIC (application specific integrated circuit), computer hardware, firmware, software, and/or combinations thereof. These various embodiments may include: being implemented in one or more computer programs, which may be executed and/or interpreted on a programmable system including at least one programmable processor. The programmable processor may be a dedicated or general-purpose programmable processor, which may receive data and instructions from a storage system, at least one input apparatus, and at least one output apparatus, and transmit the data and instructions to the storage system, the at least one input apparatus, and the at least one output apparatus.

These computer programs (also referred to as programs, software, software applications, or codes) include machine instructions of a programmable processor, and may use high-level processes and/or object-oriented programming languages, and/or assembly/machine languages to implement these computer programs. As used herein, the terms "machine readable medium" and "computer readable medium" refer to any computer program product, device, and/or apparatus (for example, magnetic disk, optical disk, memory, programmable logic device (PLD)) used to provide machine instructions and/or data to the programmable processor, including machine readable medium that receives machine instructions as machine readable signals. The term "machine readable signal" refers to any signal used to provide a machine instruction and/or data to the programmable processor.

In order to provide interaction with a user, the systems and technologies described herein may be implemented on a computer, the computer has: a display apparatus (e.g., CRT (cathode ray tube) or LCD (liquid crystal display) monitor for displaying information to the user; and a keyboard and a pointing apparatus (for example, a mouse or trackball), the user may use the keyboard and the pointing apparatus to provide input to the computer. Other kinds of apparatuses may also be used to provide interaction with the user; for example, the feedback provided to the user may be any form of sensory feedback (for example, visual feedback, auditory feedback, or tactile feedback); and may use any form (including acoustic input, voice input, or tactile input) to receive input from the user.

The systems and technologies described herein may be implemented in a computing system (e.g., as a data server) that includes back-end components, or a computing system (e.g., an application server) that includes middleware components, or a computing system (for example, a user computer with a graphical user interface or a web browser, through which the user may interact with the embodiments of the systems and technologies described herein) that includes front-end components, or a computing system that includes any combination of such back-end components, middleware components, or front-end components. The components of the system may be interconnected by any form or medium of digital data communication (e.g., a communication network). Examples of the communication network include: local area network (LAN), wide area network (WAN), Internet, and blockchain network.

The computer system may include a client and a server. The client and the server are generally far from each other and usually interact through a communication network. The client and server relationship is generated by computer programs operating on the corresponding computer and having client-server relationship with each other.

The technical solution according to embodiments of the present disclosure, by first acquiring, at set times, standalone data of each node device and process data of each process within each node device in a cloud computing environment; then detecting whether each local hot spot satisfies a preset processing condition corresponding to the each local hot spot, based on the standalone data of the each node device and the process data of each process within the each node device, and pre-acquired historical fault data corresponding to the each local hot spot; and processing, in response to detecting that a local hot spot satisfies the processing condition corresponding thereto, the local hot spot satisfying the processing condition. That is, in the embodiments of the present disclosure, by acquiring the standalone data of each node device and the process data of each process within each node device, each local hot spot may be automatically detected and automatically processed. However, in the existing local hot spot processing methods, there is no accurate judgment standard, which makes it impossible to automatically and timely detect local hot spot problems. Because the embodiment of the present disclosure adopts regular acquisition of standalone data of each node device and process data of each process within each node device, and accurate formulation the judgment standard for each local hot spot, it overcomes the problem of not being able to detect local hot spot problems automatically and timely due to the lack of accurate judgment standard in the prior art, so that the local hot spot problems may be pre-solved; in addition, the technical solution of the embodiments of the present disclosure is simple and convenient to implement, easy to popularize, and has a wider application range.

It should be understood that various forms of processes shown above may be used to reorder, add, or delete steps. For example, the steps described in the embodiments of the present disclosure may be performed in parallel, sequentially, or in different orders, as long as the desired results of the technical solution disclosed in the embodiments of the present disclosure can be achieved, no limitation is made herein.

The above specific embodiments do not constitute a limitation on the protection scope of the present application. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for processing a local hot spot, the method comprising:
acquiring, at set times, standalone data of each node device and process data of each process within each node device in a cloud computing environment, wherein the local hot spot is pre-defined as an arbitrary combination of the standalone data of each node device and process data of each process within each node device;
detecting whether each local hot spot satisfies a preset processing condition corresponding to the each local hot spot, based on the standalone data of the each node device and the process data of the each process within the each node device, and pre-acquired historical fault data corresponding to the each local hot spot; and
processing, in response to detecting that the local hot spot satisfies a processing condition corresponding to the local hot spot, the local hot spot satisfying the processing condition;
wherein, processing, in response to detecting that the local hot spot satisfies the processing condition corresponding to the local hot spot, the local hot spot satisfying the processing condition, comprises:
in response to detecting that the local hot spot satisfies the processing condition corresponding to the local hot spot, determining whether the local hot spot satisfying the processing condition is a preset critical local hot spot;
in response to the local hot spot satisfying the processing condition being the preset critical local hot spot:
sending a confirmation request to a manual monitoring device corresponding to the local hot spot;
receiving a confirmation response returned from the manual monitoring device; and
processing the local hot spot satisfying the processing condition based on the confirmation response; and
in response to the local hot spot not satisfying the processing condition being the preset critical local hot spot, processing directly the local hot spot satisfying the processing condition.

2. The method according to claim 1, wherein detecting whether each local hot spot satisfies the preset processing condition corresponding to the each local hot spot, based on the standalone data of the each node device and the process data of the each process within the each node device, and the pre-acquired historical fault data corresponding to the each local hot spot, comprises:
extracting real-time data corresponding to the each local hot spot in the standalone data of the each node device and the process data of the each process within the each node device, wherein the real-time data comprises the standalone data of the each node device and the process data of the each process within the each node device; and
detecting, based on the extracted real-time data corresponding to the each local hot spot and the pre-acquired historical fault data corresponding to the each local hot spot, whether the each local hot spot satisfies the preset processing condition corresponding to the each local hot spot.

3. The method according to claim 2, wherein detecting, based on the extracted real-time data corresponding to the each local hot spot and the pre-acquired historical fault data corresponding to the each local hot spot, whether the each local hot spot satisfies the preset processing condition corresponding to the each local hot spot, comprises:
determining that the local hot spot satisfies the processing condition corresponding to the local hot spot, in response to at least one standalone data in the extracted real-time data corresponding to the each local hot spot being same as at least one standalone data in the pre-acquired historical fault data corresponding to the local hot spot, and at least one process data in the extracted real-time data corresponding to the each local hot spot is the same as at least one process data in the pre-acquired historical fault data corresponding to the local hot spot.

4. The method according to claim 1, wherein the standalone data of the each node device at least comprises: a model of the each node device, an oversold ratio of resources of the each node device, a Central Processing Unit (CPU) of the each node device, a memory of the each node device, a total disk capacity of the each node device, a number of sales of resources of the each node device, a sales area of resources of the each node device, an available area of resources of the each node device, and a resource group included in the each node device, and wherein the process data of the each process within the each node device comprises at least: CPU utilization of the each process, memory utilization of the each process, and disk utilization of the each process.

5. An apparatus for processing a local hot spot, comprising:
at least one processor; and
a memory storing instructions, the instructions when executed by the at least one processor, cause the at least one processor to perform operations, the operations comprising:
acquiring, at set times, standalone data of each node device and process data of each process within each node device in a cloud computing environment, wherein the local hot spot is pre-defined as an arbitrary combination of the standalone data of each node device and process data of each process within each node device;
detecting whether each local hot spot satisfies a preset processing condition corresponding to the each local hot spot, based on the standalone data of the each node device and the process data of each process within the each node device, and pre-acquired historical fault data corresponding to the each local hot spot; and processing, in response to detecting that a local hot spot satisfies a processing condition corresponding to the local hot spot, the local hot spot satisfying the processing condition;

wherein, processing, in response to detecting that the local hot spot satisfies the processing condition corresponding to the local hot spot, the local hot spot satisfying the processing condition, comprises:

in response to detecting that the local hot spot satisfies the processing condition corresponding to the local hot spot, determining whether the local hot spot satisfying the processing condition is a preset critical local hot spot;

in response to the local hot spot satisfying the processing condition being the preset critical local hot spot:

sending a confirmation request to a manual monitoring device corresponding to the local hot spot;

receiving a confirmation response returned from the manual monitoring device; and processing the local hot spot satisfying the processing condition based on the confirmation response; and in response to the local hot spot not satisfying the processing condition being the preset critical local hot spot, processing directly the local hot spot satisfying the processing condition.

6. The apparatus according to claim 5, wherein detecting whether each local hot spot satisfies the preset processing condition corresponding to the each local hot spot, based on the standalone data of the each node device and the process data of the each process within the each node device, and the pre-acquired historical fault data corresponding to the each local hot spot, comprises:

extracting real-time data corresponding to the each local hot spot in the standalone data of the each node device and the process data of the each process within the each node device, wherein the real-time data comprises the standalone data of the each node device and the process data of the each process within the each node device; and detecting, based on the extracted real-time data corresponding to the each local hot spot and the pre-acquired historical fault data corresponding to the each local hot spot, whether the each local hot spot satisfies the preset processing condition corresponding to the each local hot spot.

7. The apparatus according to claim 6, wherein detecting, based on the extracted real-time data corresponding to the each local hot spot and the pre-acquired historical fault data corresponding to the each local hot spot, whether the each local hot spot satisfies the preset processing condition corresponding to the each local hot spot, comprises:

determining that the local hot spot satisfies the processing condition corresponding to the local hot spot, in response to at least one standalone data in the extracted real-time data corresponding to the each local hot spot being the same as at least one standalone data in the pre-acquired historical fault data corresponding to the local hot spot, and at least one process data in the extracted real-time data corresponding to the each local hot spot being same as at least one process data in the pre-acquired historical fault data corresponding to the local hot spot.

8. The apparatus according to claim 5, wherein the standalone data of each node device at least comprises: a model of the each node device, an oversold ratio of resources of the each node device, a Central Processing Unit (CPU) of each node device, a memory of each node device, a total disk capacity of the each node device, a number of sales of resources of the each node device, a sales area of resources of the each node device, an available area of resources of the each node device, and a resource group included in the each node device, and wherein the process data of each process within the each node device comprises at least: CPU utilization of each process, memory utilization of each process, and disk utilization of the each process.

9. A non-transitory computer readable storage medium, storing computer instructions thereon, wherein the computer instructions, when executed by a processor, causes the processor to perform operations, the operations comprising:

acquiring, at set times, standalone data of each node device and process data of each process within each node device in a cloud computing environment;

detecting whether each local hot spot satisfies a preset processing condition corresponding to the each local hot spot, based on the standalone data of the each node device and the process data of the each process within the each node device, and pre-acquired historical fault data corresponding to the each local hot spot, wherein the local hot spot is pre-defined as an arbitrary combination of the standalone data of each node device and process data of each process within each node device; and processing, in response to detecting that the local hot spot satisfies a processing condition corresponding to the local hot spot, the local hot spot satisfying the processing condition;

wherein, processing, in response to detecting that the local hot spot satisfies the processing condition corresponding to the local hot spot, the local hot spot satisfying the processing condition, comprises:

in response to detecting that the local hot spot satisfies the processing condition corresponding to the local hot spot, determining whether the local hot spot satisfying the processing condition is a preset critical local hot spot;

in response to the local hot spot satisfying the processing condition being the preset critical local hot spot:

sending a confirmation request to a manual monitoring device corresponding to the local hot spot receiving a confirmation response returned from the manual monitoring device; and processing the local hot spot satisfying the processing condition based on the confirmation response; and in response to the local hot spot not satisfying the processing condition being the preset critical local hot spot, processing directly the local hot spot satisfying the processing condition.

10. The non-transitory computer readable storage medium according to claim 9, wherein detecting whether each local hot spot satisfies the preset processing condition corresponding to the each local hot spot, based on the standalone data of the each node device and the process data of the each process within the each node device, and the pre-acquired historical fault data corresponding to the each local hot spot, comprises:

extracting real-time data corresponding to the each local hot spot in the standalone data of the each node device and the process data of the each process within the each node device, wherein the real-time data comprises the standalone data of the each node device and the process data of the each process within the each node device; and detecting, based on the extracted real-time data corresponding to the each local hot spot and the pre-acquired historical fault data corresponding to the each local hot spot, whether the each local hot spot satisfies the preset processing condition corresponding to the each local hot spot.

11. The non-transitory computer readable storage medium according to claim 10, wherein detecting, based on the extracted real-time data corresponding to the each local hot spot and the pre-acquired historical fault data corresponding to the each local hot spot, whether the each local hot spot satisfies the preset processing condition corresponding to the each local hot spot, comprises:

determining that the local hot spot satisfies the processing condition corresponding to the local hot spot, in response to at least one standalone data in the extracted real-time data corresponding to the each local hot spot being the same as at least one standalone data in the pre-acquired historical fault data corresponding to the local hot spot, and at least one process data in the extracted real-time data corresponding to the each local hot spot is the same as at least one process data in the pre-acquired historical fault data corresponding to the local hot spot.

12. The non-transitory computer readable storage medium according to claim 9, wherein the standalone data of the each node device at least comprises: a model of the each node device, an oversold ratio of resources of the each node device, a Central Processing Unit (CPU) of the each node device, a memory of the each node device, a total disk capacity of the each node device, a number of sales of resources of the each node device, a sales area of resources of the each node device, an available area of resources of the each node device, and a resource group included in the each node device, and wherein the process data of the each process within the each node device comprises at least: CPU utilization of the each process, memory utilization of the each process, and disk utilization of the each process.

* * * * *